United States Patent
Alissa et al.

(10) Patent No.: US 11,891,564 B2
(45) Date of Patent: *Feb. 6, 2024

(54) SYSTEMS AND METHODS IN WHICH COLLOIDAL SILICA GEL IS USED TO RESIST CORROSION OF A WELLHEAD COMPONENT IN A WELL CELLAR

(71) Applicant: Saudi Arabian Oil Company, Dhahran (SA)

(72) Inventors: Faisal Alissa, Dammam (SA); Bader Aljuaid, Riyadh (SA); Omar Ashi, Jeddah (SA); Rashed Altowairqi, Taif (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,819

(22) Filed: Mar. 31, 2022

(65) Prior Publication Data
US 2023/0313020 A1 Oct. 5, 2023

(51) Int. Cl.
*C09K 8/42* (2006.01)
*C09K 8/86* (2006.01)
*C09K 8/84* (2006.01)

(52) U.S. Cl.
CPC ............. *C09K 8/426* (2013.01); *C09K 8/845* (2013.01); *C09K 8/86* (2013.01); *C09K 2208/32* (2013.01)

(58) Field of Classification Search
CPC .......... C09K 8/426; C09K 8/845; C09K 8/86; C09K 8/422; C09K 8/42; C09K 8/46;
(Continued)

(56) References Cited

U.S. PATENT DOCUMENTS 3,461,957 A * 8/1969 West ................ E21B 33/037
166/368
3,498,392 A * 3/1970 Knorr ................ E21B 15/02
175/5

(Continued)

FOREIGN PATENT DOCUMENTS

CA 898687 4/1972
CN 109458128 3/2019
(Continued)

OTHER PUBLICATIONS

CROFT Production Systems, Christmas Tree or Wellhead, retrieved Jun. 2, 2023 from https://www.croftsystems.net/oil-gas-blog/the-difference-between-a-wellhead-christmas-tree/, 2009-2021 (Year: 2021).*

(Continued)

*Primary Examiner* — Angela M DiTrani Leff
(74) *Attorney, Agent, or Firm* — Fish & Richardson P.C.

(57) ABSTRACT

A system includes a well cellar, a wellhead and a colloidal silica gel. The well cellar includes a base and sidewalls extending from the base. The wellhead includes an aboveground region extending above the well cellar and a belowground region in the well cellar. The belowground region of the wellhead includes a wellhead component having an exterior surface. The colloidal silica gel occupies a volume extending from the base and sidewalls of the well cellar to the exterior surface of the wellhead component. The colloidal silica gel covers the exterior surface of the wellhead component.

20 Claims, 6 Drawing Sheets

(58) Field of Classification Search
CPC ..... C09K 2208/32; E21B 33/13; E21B 33/14; E21B 33/146; E21B 33/16
See application file for complete search history.

(56) References Cited

U.S. PATENT DOCUMENTS

| | | | |
|---|---|---|---|
| 3,654,993 A | 4/1972 | Smith et al. | |
| 4,650,594 A | 3/1987 | Wu | |
| 4,664,193 A | 5/1987 | Wu | |
| 4,745,139 A | 5/1988 | Hassl et al. | |
| 4,844,164 A * | 7/1989 | Shen | C09K 8/42 166/291 |
| 5,623,993 A | 4/1997 | Van Buskirk et al. | |
| 6,121,336 A | 9/2000 | Okoroafor et al. | |
| 6,913,081 B2 | 7/2005 | Powell et al. | |
| 7,637,692 B1 | 12/2009 | Rose | |
| 7,732,016 B2 | 6/2010 | Van Ooij et al. | |
| 7,987,904 B1 * | 8/2011 | Rose | E21B 33/03 52/220.8 |
| 8,900,670 B2 | 12/2014 | Singh et al. | |
| 9,199,879 B2 | 12/2015 | Thaemlitz et al. | |
| 10,202,816 B1 | 2/2019 | Stierwalt | |
| 10,995,906 B1 * | 5/2021 | Meheen | B65G 5/00 |
| 2004/0033905 A1 | 2/2004 | Shinbach et al. | |
| 2004/0154799 A1 | 8/2004 | Powell et al. | |
| 2006/0134339 A1 | 6/2006 | Wang et al. | |
| 2013/0081955 A1 * | 4/2013 | Al-Mubasher | C23F 13/06 204/196.36 |
| 2013/0209175 A1 * | 8/2013 | Keyworth | E21B 33/0375 405/184.1 |
| 2014/0076563 A1 | 3/2014 | Lin et al. | |
| 2015/0101831 A1 | 4/2015 | Dugas et al. | |
| 2016/0090806 A1 | 3/2016 | Dugas | |
| 2016/0222747 A1 | 8/2016 | Rose | |
| 2017/0349763 A1 | 12/2017 | Wu et al. | |
| 2018/0208826 A1 * | 7/2018 | Bourcier | F24T 10/20 |
| 2018/0327648 A1 * | 11/2018 | Bataweel | C04B 28/24 |
| 2022/0010192 A1 | 1/2022 | Lewis et al. | |

FOREIGN PATENT DOCUMENTS

| | | |
|---|---|---|
| CN | 111022020 | 4/2020 |
| EP | 3353368 | 2/2021 |
| WO | 2004061046 | 7/2004 |
| WO | WO 2004104557 | 12/2004 |
| WO | 2009059798 | 5/2009 |
| WO | 2014190226 | 11/2014 |
| WO | 2015103096 | 7/2015 |
| WO | 2018091986 | 5/2018 |

OTHER PUBLICATIONS

U.S. Appl. No. 17/710,011, Alissa et al., filed Mar. 31, 2022.
U.S. Appl. No. 17/710,021, Alissa et al., filed Mar. 31, 2022.
Ahmad et al., "Hydrophobicity—a green technique for enhancing corrosion resistance of alloys." New Trends in Alloy Development, Characterization and Application, Sep. 2015, 43 pages.
Drdlová et al., "Effect of nanoparticle modification on static and dynamic behaviour of foam based blast energy absorbers." Cellular Polymers 35.3, May 2016, 143-158, 16 pages.
Gurav et al., "Silica aerogel: synthesis and applications." Journal of Nanomaterials, Jan. 2010, 11 pages.
Hillesheim et al., "Effects of Surface Modification Conditions on Hydrophobicity of Silica-based Coating Additives." Corrosion 2013. OnePetro, Mar. 2013, 11 pages.
Hunt et al., "Kinetics of the gelation of colloidal silica at geothermal conditions, and implications for reservoir modification and management" No. LLNL-CONF-614952. Lawrence Livermore National Lab.(LLNL), Livermore, CA (United States), Jan. 2013, 12 pages.
Jiantao, L., & Bingzheng, H. (2013). Development of Silica Aerogel and Hollow Glass Microspheres Based Heat-Insulating Coatings [J]. Paint & Coatings Industry, 7., 2013, 2 pages (Abstract Only).
Keivani et al., "Synergistic toughening in ternary silica/hollow glass spheres/epoxy nanocomposites." Polymer-Plastics Technology and Engineering 54.6, Apr. 2015, 581-593, 14 pages.
Lesbayev et al., "Hydrophobic sand on the basis of superhydrophobic soot synthesized in the flame." Journal of Materials Science and Chemical Engineering 2.1, Jan. 2014, 63-65, 3 pages.
Magryta, "Wpływ aerożelu na właściwości wulkanizatów kauczuku butadienowo-akrylonitrylowego (NBR)." Polimery 57.2, Feb. 2012, 117-123, 7 pages.
Maleki et al., "An overview on silica aerogels synthesis and different mechanical reinforcing strategies." Journal of Non-Crystalline Solids 385, Feb. 2014, 55-74, 20 pages.
Rotaru et al., "Performances of clay aerogel polymer composites for oil spill sorption: Experimental design and modeling." Separation and Purification Technology 133, Sep. 2014, 260-275, 16 pages.
Shi et al., "Superhydrophobic silica aerogels reinforced with polyacrylonitrile fibers for adsorbing oil from water and oil mixtures." RSC advances 7.7, 2017, 4039-4045, 7 pages.
Vu et al., "Evaluation of the corrosion inhibiting capacity of silica/polypyrrole-oxalate nanocomposite in epoxy coatings." International Journal of Corrosion, Jan. 2018, 11 pages.
Zhao et al., "Chemical solution to ESP packer penetrator corrosion problem." International Petroleum Technology Conference. OnePetro, Jan. 2020, 7 pages.
Zhao et al., "Development of low density rigid gels/composites for ESP packer penetrator protection." SPE Kingdom of Saudi Arabia Annual Technical Symposium and Exhibition. OnePetro, Apr. 2018, 10 pages.
Zuo et al., "Polymer/carbon-based hybrid aerogels: preparation, properties and applications" Materials, 8(10), Oct. 2015, 6806-6848., 43 pages.
PCT International Search Report in International Appln. No. PCT/US2023/017070, dated Jun. 30, 2023, 14 pages.
PCT International Search Report in International Appln. No. PCT/US2023/016748, dated Jun. 28, 2023, 12 pages.
Jurlnak et al., "Oilfield Applications of colloidal silica gel," SPE Production Engineering, Nov. 1991, 7 pages.

* cited by examiner

SYSTEMS AND METHODS IN WHICH COLLOIDAL SILICA GEL IS USED TO RESIST CORROSION OF A WELLHEAD COMPONENT IN A WELL CELLAR

FIELD

The disclosure generally relates to systems and methods in which colloidal silica gel is used to resist corrosion of a wellhead component in a well cellar.

BACKGROUND

In general, an oil producing well has wellhead components that are above ground and wellhead components that are belowground. Some of the wellhead components that are belowground are present in the well cellar. Examples of such wellhead components include the surface casing and the landing base. In general, the wellhead components in the well cellar are covered with sand. In some cases, an above ground wellhead component, such as a water injection line flange, can leak and cause the sand in the well cellar to get wet. In certain cases, rain causes the sand in the well cellar to get wet. Other sources of water can also make the sand in the well cellar wet. The water in the sand in the well cellar can result in corrosion of one or more of the wellhead components present in the well cellar, such as the landing base and/or the surface casing. In addition to water itself, corrosion can be induced by oxygen dissolved in the water.

SUMMARY

The disclosure generally relates to systems and methods in which colloidal silica gel is used to resist corrosion of a wellhead component in a well cellar. For example, the well of the system can be an oil well, a gas well or a water well. In general, the disclosure provides a colloidal silica gel that occupies a volume that extends from the surface of the wellhead component to the base and sidewalls of the cellar well. As an example, in some embodiments, the colloidal silica gel covers a portion of the surface of a wellhead surface casing and extends to the base and sidewalls of the well cellar such that the colloidal silica gel occupies a volume of space between the well cellar and the covered surface of the surface casing. As another example, in certain embodiments, the colloidal silica gel completely covers the surface of a landing base and extends to the base and sidewalls of the well cellar such that the colloidal silica gel occupies a volume of space between the well cellar and the covered surface of the landing base. As a further example, in some embodiments, the colloidal silica gel covers a portion of the surface of a wellhead surface casing and a portion of the surface of the landing base and extends to the base and sidewalls of the well cellar such that the colloidal silica gel occupies a volume of space between the well cellar, and the covered surface of the wellhead surface casing and the covered surface of the landing base.

In general, the colloidal silica gel is formed by precipitation from a composition containing colloidal silica, water and an activator. In some embodiments, the composition further includes an oxygen scavenger and/or a corrosion inhibitor. The oxygen scavenger and/or corrosion inhibitor can be employed to reduce (e.g., avoid) corrosion due to water contained in the composition and/or species, such as dissolved oxygen, present in the water.

In general, the composition is disposed in the well cellar relatively quickly (e.g., immediately) after preparation. Gel formation due to precipitation can occur shortly (e.g. immediately) after mixing the components of the composition. In some embodiments, relatively quickly (e.g., immediately) after mixing, the composition is poured into the well cellar (e.g., on top of the bottom of the well cellar or on top of a sand layer disposed on of the bottom of the well cellar), generally at a close distance to evenly distribute the composition. The gel is disposed in the space between the well cellar and the wellhead component rather than simply as a coating on the wellhead component.

In general, sand is disposed on top of the colloidal silica gel and completely covers the upper surface of the gel. Typically, therefore, the colloidal silica gel is not directly exposed at the earth's surface. When the colloidal silica precipitates from the composition, an aqueous phase is formed on top of the colloidal silica gel. The sand may adsorb the aqueous phase of the composition left after the colloidal silica is precipitated. The sand also helps to reduce (e.g., avoid) erosion of the colloidal silica gel by external factors, such as the weather.

Over a substantial period of time, little if any of the water in the sand covering the colloidal silica gel is able to penetrate through the colloidal silica gel to reach the gel-covered wellhead component(s). Thus, the colloidal silica gel helps resist, or even completely prevent, corrosion of the gel-covered well components. More generally, it is believed that the gel can behave as a barrier to water and optionally other liquids. In general, the colloidal silica gel is non-corrosive and would not corrode, for example, under acidic conditions.

The systems and related methods can be relatively inexpensive and easy to produce and implement. In addition, the systems and methods can mitigate safety issues and environmental impacts related to corrosion of wellhead components. Further, the systems and methods can reduce or eliminate the need for repairing and/or replacing corroded wellhead components, which can be costly and difficult. Additionally, systems and methods according to the disclosure can reduce the time and cost associated with monitoring and inspecting for corrosion of wellhead components. As an example, the landing base is a wellhead component located in the well cellar. In general, the landing base cannot be replaced riglessly. As a result, the lost use time of the well and/or the cost associated with repairing or replacing the landing base can be substantial. As another example, the portion of a wellhead surface casing in the well cellar can get severely corroded by moisture. Repairing such a corroded surface casing can involve a deep excavation of the wellhead, and replacing such a corroded surface casing can involve a workover. Therefore, using colloidal silica gel to reduce or eliminate corrosion of the landing base and/or a wellhead surface casing can result in substantial savings and improved productivity.

In a first aspect, the disclosure provides a system that includes a well cellar that includes a base and sidewalls extending from the base. The system also includes a wellhead that includes an aboveground region extending above the well cellar and a belowground region in the well cellar. The belowground region of the wellhead including a wellhead component having an exterior surface. The system further includes a colloidal silica gel occupying a volume extending from the base and sidewalls of the well cellar to the exterior surface of the wellhead component. The colloidal silica gel covers the exterior surface of the wellhead component.

In some embodiments, the colloidal silica gel substantially prevents water from passing through the colloidal silica gel to reach the exterior surface of the wellhead component.

In some embodiments, the system further includes a solid covering an upper surface of the colloidal silica gel.

In some embodiments, the system further includes sand covering an upper surface of the colloidal silica gel.

In some embodiments, the wellhead component includes a landing base.

In some embodiments, the wellhead component includes a surface casing. In certain embodiments, the colloidal silica gel covers an exterior surface of an additional wellhead component. In some embodiments, the additional wellhead component includes a landing base.

In some embodiments, the system includes a well selected from the group consisting of an oil well, a gas well and a water well.

In some embodiments, the base of the well cellar has an opening, and the wellhead includes a plurality of casings that pass through and extend beneath the base of the well cellar.

In some embodiments, the plurality of casings include a surface casing that houses the other casings.

In some embodiments, the volume occupied by the gel is at least one cubic foot.

In some embodiments, the colloidal silica gel includes at least 6.5 wt. % colloidal silica.

In a second aspect, the disclosure provides a method of reducing corrosion of an exterior surface of a wellhead component in a well cellar. The method includes: disposing a composition within the well cellar, the composition including colloidal silica, water, an activator, an oxygen scavenger and a corrosion inhibitor; and allowing colloidal silica to precipitate from the composition to provide a colloidal silica gel. The colloidal silica gel covers the exterior surface of the wellhead component and extends to a base and sidewalls of the well cellar.

In some embodiments, the activator is NaCl or 1,6-hexanediol-diglycidyl-ether.

In some embodiments, the method further includes covering the colloidal silica gel with sand.

In some embodiments, the wellhead component is a landing base and/or a surface casing.

In some embodiments, the composition includes: from 66 wt. % to 91.5 wt. % water; from 6.5 wt. % to 32 wt. % colloidal silica; from 0.2 wt. % to 4 wt. % NaCl; from 0.04 wt. % to 1 wt. % oxygen scavenger; and from 1 wt. % to 15 wt. % corrosion inhibitor.

In some embodiments, the composition includes: from 66 wt. % to 91.5 wt. % water; from 6.5 wt. % to 32 wt. % colloidal silica; from 2.5 wt. % to 15 wt. % 1,6-hexanediol-diglycidyl-ether; from 0.04 wt. % to 1 wt. % oxygen scavenger; and from 1 wt. % to 15 wt. % corrosion inhibitor.

In some embodiments, the colloidal silica gel occupies a volume of at least one cubic foot.

DETAILED DESCRIPTION

Figure 1:
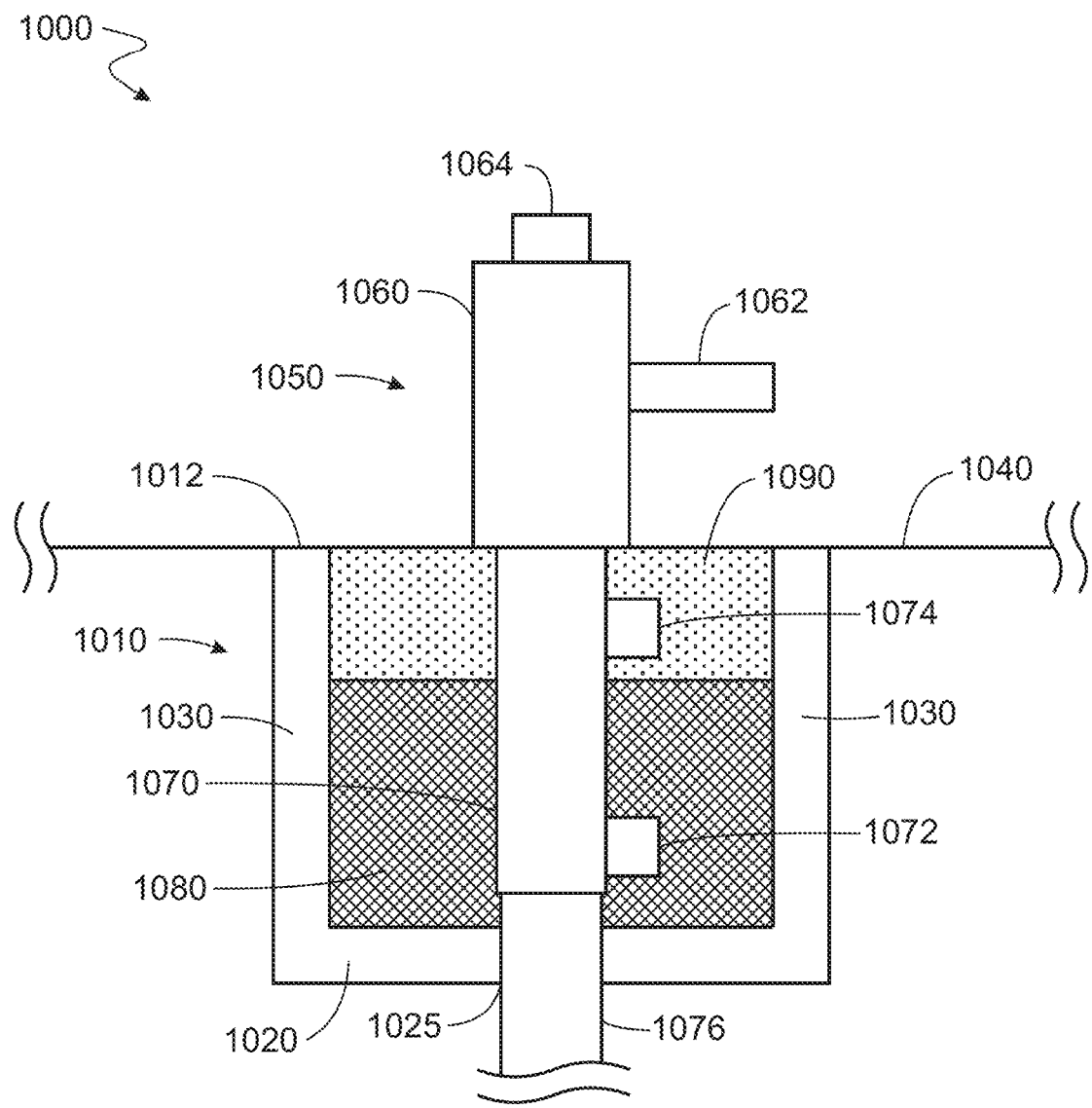
FIG. 1 is a schematic illustration of a system.

FIG. 1 schematically depicts a system 1000, which can, for example, be part of a well, such as an oil well, a gas well or a water well.

The system 1000 includes a well cellar 1010 having a bottom 1020 and sidewalls 1030. The uppermost surface 1012 of the well cellar 1010 substantially corresponds to the surface 1040 of the earth such that the well cellar 1010 is generally located belowground.

The system 1000 also includes a wellhead 1050 having an aboveground wellhead region 1060 that extends above the surface 1040 and a belowground wellhead region 1070 that extends below the surface 1040, through the well cellar 1010, and through an opening 1025 in the bottom 1020 of the well cellar 1010. Generally, the wellhead regions 1060 and 1070 have a variety of different components. As an example, as shown in FIG. 1, the aboveground wellhead region 1060 can include a water injection line flange 1062 and a crown adapter 1064, and the belowground wellhead region 1070 can include a landing base 1072 and a tubing spool 1074. The wellhead 1050 includes a surface casing 1076 having its exterior surface exposed within the well cellar 1010. The surface casing 1076 houses a plurality of nested casings that are exposed beneath the bottom 1020 of the well cellar 1010 (see FIGS. 2-4).

Figure 2:
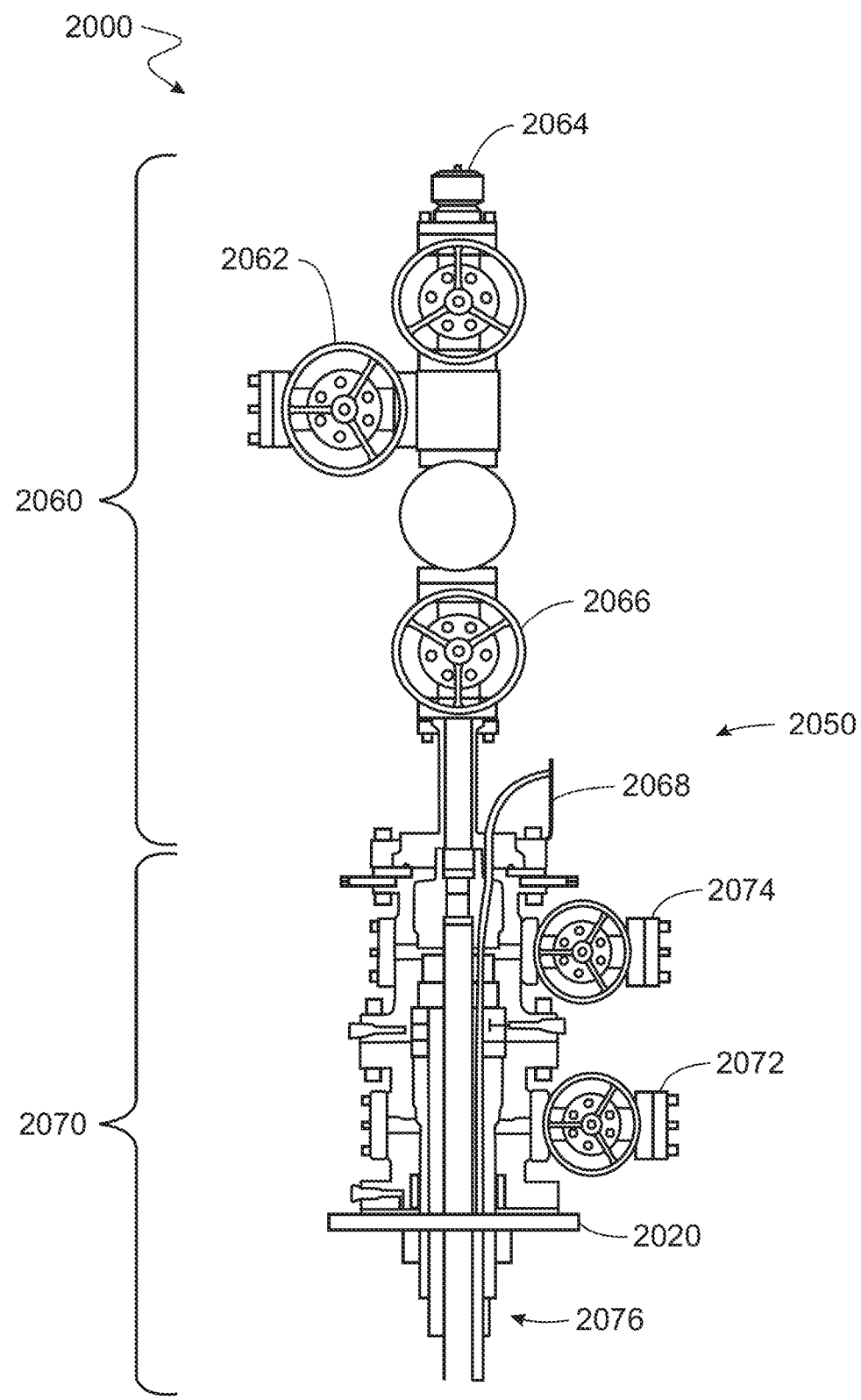
FIG. 2 is a schematic illustration of a system.

FIG. 2 schematically depicts a system 2000 including a wellhead 2050 having aboveground and belowground regions 2060 and 2070, respectively. The aboveground region 2060 includes a water injection valve 2062, a crown adapter 2064, an additional valve 2066 and a tubing bonnet 2068. The belowground region 2070 includes a landing base 2072 and a tubing spool 2074, which are disposed above a bottom 2020 of the well cellar. The belowground region 2070 also includes a plurality of nested casings housed within a surface casing (generally depicted at 2076) and extending below the bottom 2020 of the well cellar.

Figure 3:
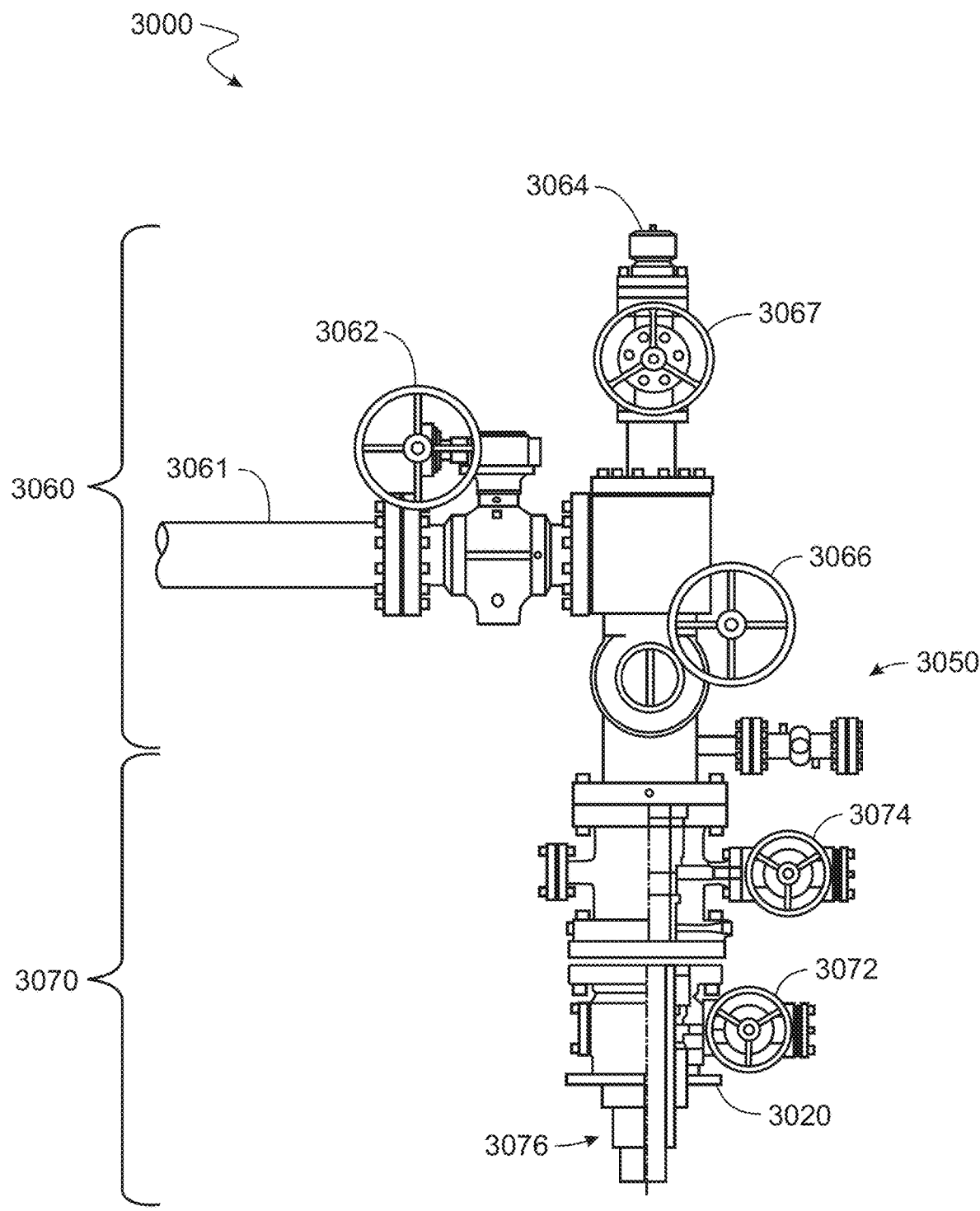
FIG. 3 is a schematic illustration of a system.

FIG. 3 schematically depicts a system 3000 including a wellhead 3050 having aboveground and belowground regions 3060 and 3070, respectively. The aboveground region 3060 includes a water flow pipe 3061 in fluid communication with a water injection valve 3062. In addition, the aboveground region includes a crown adapter 3064 and additional valves 3066 and 3067. The belowground region 3070 includes a landing base 3072 and a tubing spool 3074, which are disposed above a bottom 3020 of the well cellar. The belowground region 3070 further includes a surface casing and a plurality of nested casings (generally depicted at 3076) that extend through and below the bottom 3020 of the well cellar. In some embodiments, the injection line flange between the water flow pipe 3061 and the water injection valve 3062 can leak, for example, due to air exposure and continuous water flow. This can cause the leaking water to spill onto the sand covering the well cellar, which can result in corrosion of the surface casing 3076, the landing base 3072 and/or the tubing spool 3074.

Figure 4:
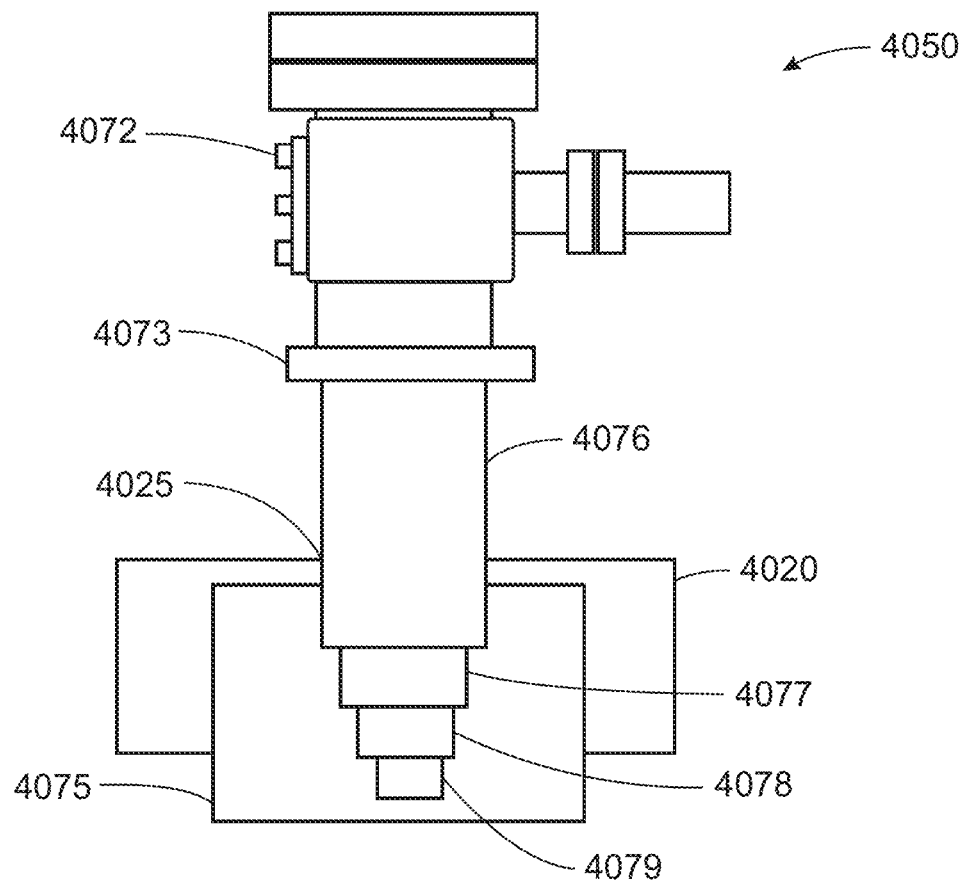
FIG. 4 is a schematic illustration of a system.

FIG. 4 schematically depicts a belowground region of a wellhead 4050. Above a bottom 4020 of the well cellar, the wellhead 4050 includes a landing base 4072, a donut plate 4073 and a surface casing 4076. The surface casing 4076 extends through an opening 4025 in the bottom 4020 of the well cellar and into a conductor 4075. The surface casing 4076 houses a plurality of nested casings 4077, 4078 and 4079. In some embodiments, the bottom 4020 of the well cellar is made of cement. The integrity of the cement is sometimes low and cracks can develop in the cement, which can allow water penetration thereby inducing corrosion, for example, at the interface of the surface casing 4076 and the bottom 4020 of the well cellar. The colloidal silica gel can reduce, e.g., prevent, such corrosion.

Referring again to FIG. 1, the system 1000 also includes a colloidal silica gel 1080 that completely covers a portion of the exterior surface of the surface casing 1076 and the landing base 1072 and extends to the bottom 1020 and sidewalls 1030 of the well cellar 1010. Thus, the colloidal silica gel 1080 occupies a volume of space between the well cellar 1010, and the gel-covered exterior surfaces of the surface casing 1076 and the landing base 1072. A layer of sand 1090 is disposed on top of the colloidal silica gel 1080. With this arrangement, the colloidal silica gel 1080 acts as a barrier that, over a substantial period of time, can prevent water present in the sand 1090 from reaching the gel-covered exterior surfaces of the surface casing 1076 and the landing base 1072, thereby maintaining substantially dry conditions around the gel-covered exterior surface of the surface casing 1076 and the landing base 1072. As a result, over these periods of time, the colloidal silica gel helps to resist, and even completely prevent, corrosion of the gel-covered exterior surfaces of the surface casing 1076 and the landing base 1072.

Figure 5:
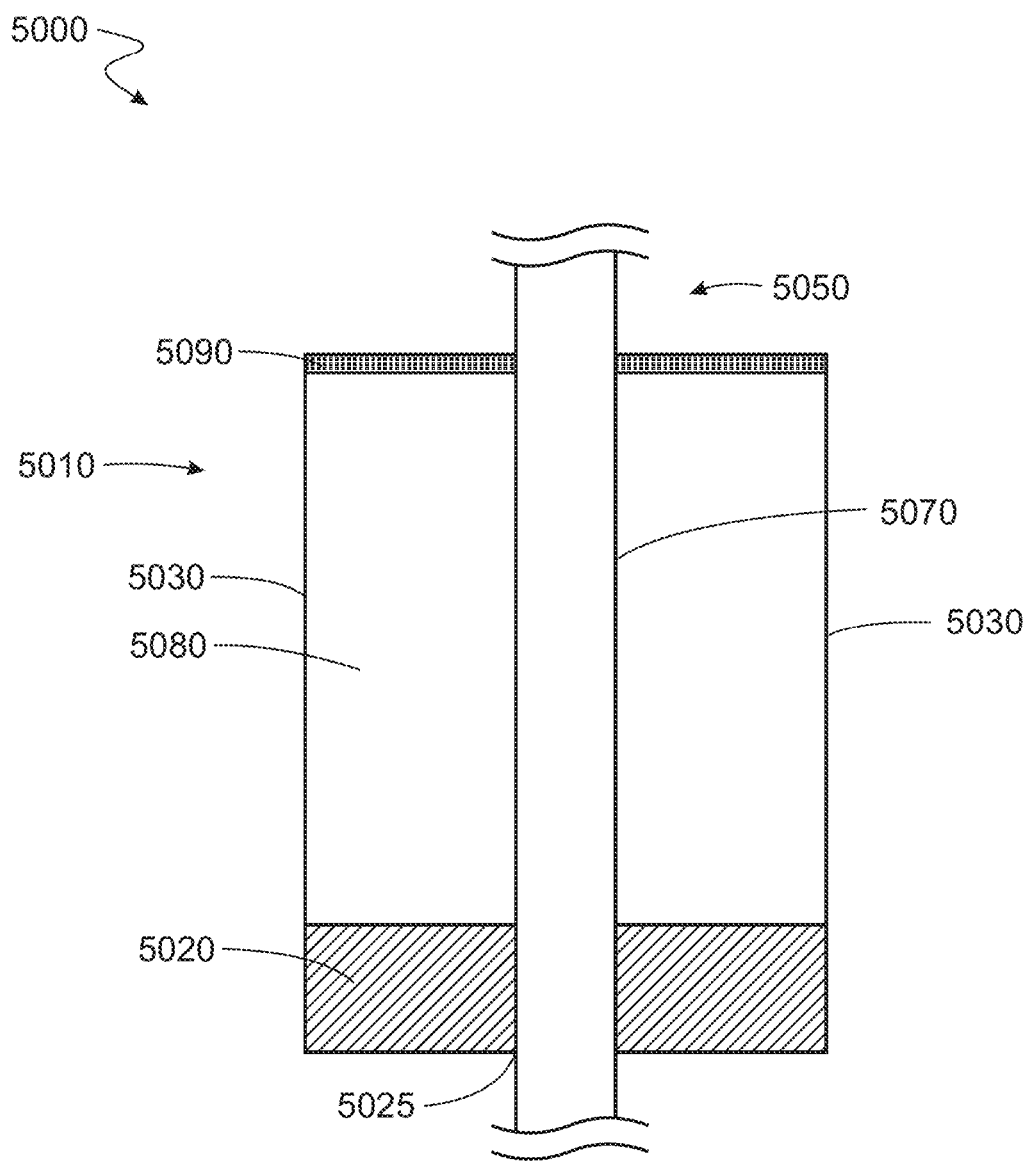
FIG. 5 is a schematic illustration of a system.

FIG. 5 schematically depicts a system 5000 that includes a well cellar 5010 having a bottom 5020 and sidewalls 5030. The system 5000 also includes a wellhead 5050 having a belowground region 5070 that extends through the well cellar 5010, and through an opening 5025 in the bottom 5020 of the well cellar 5010. The system 5000 also includes a colloidal silica gel 5080 that completely covers a portion of the exterior surface of the belowground wellhead region 5070 and extends to the bottom 5020 and sidewalls 5030 of the well cellar 5010. In some embodiments, portion of the exterior surface of the belowground wellhead region 5070 covered by the colloidal silica gel includes a landing base. In some embodiments, portion of the exterior surface of the belowground wellhead region 5070 covered by the colloidal silica gel includes a surface casing. A layer of sand 5090 is disposed on top of the colloidal silica gel 5080. In some embodiments, the bottom 5020 layer below the colloidal silica gel 5080 includes cement. In some embodiments, the bottom 5020 layer below the colloidal silica gel 5080 includes sand.

In certain embodiments, the well cellar 5010 (or 1010) has a diameter of at least 1.25 (e.g. 1.36, at least 1.4, at least at least 1.5, at least 1.6, at least 1.7, at least 1.8, at least 1.9, at least 2.0) meters (m) and at most 5 (e.g. at most 4, at most 3) m.

In some embodiments, the well cellar 5010 (or 1010) has a depth of at least 4.5 (e.g. 4.54, at least 5, at least 6, at least 7, at least 8, at least 9) feet (ft) and at most 10 (e.g. at most 9, at most 8, at most 7, at most 6, at most 5) ft.

In general, the height of the colloidal silica gel is sufficient to at least partially (e.g., completely) cover the landing base. In some embodiments, the distance between the bottom of the well cellar and the highest part of the landing base is 10 feet. In certain embodiments, the height of the colloidal silica gel 5080 (or 1080) in the well is at least 1 (e.g. at least 2, at least 3, at least 4, at least 5, at least 6, at least 7, at least 8, at least 9) ft and at most 10 (e.g. at most 9, at most 8, at most 7, at most 6, at most 5, at most 4, at most 3, at most 2) ft.

In some embodiments, the volume occupied by the colloidal silica gel 5080 (or 1080) is at least 1 (e.g., at least 5, at least 10) cubic feet (ft$^3$) and at most 30 (e.g., at most 25, at most 20) ft$^3$.

In general, the colloidal silica gel 5080 (or 1080) has a density greater than that of water. In certain embodiments, the colloidal silica gel has a density of at least 1.13 (e.g. 1.14, 1.15, 1.3) g/ml and at most 2.5 g/mL.

In general, the colloidal silica gel 5080 (or 1080) is formed by precipitation from a composition that includes colloidal silica, water and an activator. As used herein, an "activator" is a species that promotes precipitation of the colloidal silica out of the composition. Examples of activators include NaCl and 1,6-hexanediol-diglycidyl-ether (Razeen® D7109). In some embodiments, the composition further includes a corrosion inhibitor (e.g., O-3670R) and/or an oxygen scavenger (e.g., sodium sulfite ($Na_2SO_3$), OXY-GON™ or FE-20). In general, the corrosion inhibitor and/or oxygen scavenger prevent the water of the composition and/or dissolved oxygen from causing corrosion.

Generally, the composition is prepared by combining the components with mixing if desired. In general, the composition is then relatively quickly (e.g., immediately) disposed in the well cellar 5010 (or 1010). Typically, within a short time period (e.g., immediately), colloidal silica precipitates from the composition, resulting in formation of the colloidal silica gel 5080 (or 1080) and an aqueous layer on top of the colloidal silica gel 5080 (or 1080). The sand 5090 (or 1090) is disposed on top of the aqueous layer, and the sand absorbs the water from the aqueous layer.

In some embodiments, the composition contains at least 5000 (e.g. at least 6000, at least 7000, at least 8000) liters (L) of water and at most 11000 (e.g. at most 10000, at most 9000, at most 8000) L of water.

In certain embodiments, the composition contains at least 5000 (e.g. at least 6000, at least 7000) L of 20 weight percent (wt. %) colloidal silica solution and at most 11000 (e.g. at most 10000, at most 9000, at most 8000) L of 20 wt. % colloidal silica solution.

In some embodiments, the composition contains at least 100 (e.g. at least 200, at least 500, at least 600, at least 700) kilograms (kg) of NaCl and at most 1000 (e.g. at most 900, at most 800) kg of NaCl.

In certain embodiments, the composition contains at least 1000 (e.g. at least 1100, at least 1200, at least 1300, at least 1400) L of 1,6-hexanediol-diglycidyl-ether and at most 2100 (e.g. at most 2000, at most 1900, at most 1800) L 1,6-hexanediol-diglycidyl-ether.

In some embodiments, the composition contains at least 2.2 (e.g. at least 2.5, at least 3.0, at least 3.5, at least 4.0, at least 4.5, at least 4.8) kg of oxygen scavenger and at most 4.85 (e.g. at most 4.8, at most 4.5, at most 4.0, at most 3.5, at most 3.0, at most 2.5) kg of oxygen scavenger.

In certain embodiments, the composition contains at least 50 (e.g. at least 60, at least 70, at least 80, at least 90, at least 100, at least 105) kg of corrosion inhibitor and at most 110 (e.g. at most 105, at most 100, at most 90, at most 80, at most 70, at most 60) kg of corrosion inhibitor.

In certain embodiments, the composition contains at least 50 (e.g. at least 60, at least 70, at least 80, at least 90, at least 100, at least 105) L of corrosion inhibitor and at most 110 (e.g. at most 105, at most 100, at most 90, at most 80, at most 70, at most 60) L of corrosion inhibitor.

In some embodiments, the composition contains at least 6.5 (e.g., at least 10, at least 15) weight percent (wt. %) colloidal silica at most 32 (e.g., at most 25, at most 20) wt. % colloidal silica.

In certain embodiments, the composition contains at least 66 (e.g., at least 73, at least 78) wt. % water and at most 91.5 (e.g., at most 88, at most 83) wt. % water.

In some embodiments in which the activator is NaCl, the composition contains at least 0.2 (e.g., at least 0.5, at least 1, at least 2) wt. % NaCl and at most 4 (e.g., at most 3, at most 2) wt. % NaCl.

In certain embodiments in which the activator is 1,6-hexanediol-diglycidyl-ether, the composition contains at least 2.5 (e.g., at least 5, at least 7.5, at least 8) wt. % 1,6-hexanediol-diglycidyl-ether and at most 15 (e.g., at most 12.5, at most 10, at most 8) wt. % 1,6-hexanediol-diglycidyl-ether.

In some embodiments, the composition contains at least 0.04 (e.g., at least 0.07, at least 0.1) wt. % oxygen scavenger and at most 1 (e.g., at most 0.9, at most 0.8) wt. % oxygen scavenger.

In certain embodiments, the composition contains at least 1 (e.g., at least 5, at least 8, at least 10) wt. % corrosion inhibitor and at most 15 (e.g., at most 12) wt. % corrosion inhibitor.

Table 1 lists two exemplary compositions.

TABLE 1

|  | CB17 | NaCl | 1,6-Hexanediol-diglycidyl-ether | OXYGON or FE-200 | O-36670R |
|---|---|---|---|---|---|
| Composition 1 | 54 wt % | 2 wt % | — | 0.07 wt % | 1 wt % |
| Composition 2 | 51 wt % | — | 8 wt % | 0.07 wt % | 1 wt % |

In some embodiments, the colloidal silica gel 5080 (or 1080) contains only colloidal silica. However, in certain embodiments, the colloidal silica gel 5080 (or 1080) contains water, activator (e.g. NaCl or 1,6-hexanediol-diglycidyl-ether), oxygen scavenger and/or corrosion inhibitor. As an example, in some embodiments, the colloidal silica gel 5080 (or 1080) contains at least 6.5 (e.g., at least 10, at least 15) weight percent (wt. %) colloidal silica at most 32 (e.g., at most 25, at most 20) wt. % colloidal silica. As another example, in certain embodiments, the colloidal silica gel 5080 (or 1080) contains at least 66 (e.g., at least 73, at least 78) wt. % water and at most 91.5 (e.g., at most 88, at most 83) wt. % water. As a further example, in some embodiments, the colloidal silica gel 5080 (or 1080) contains at least 0.2 (e.g., at least 0.5, at least 1, a least 2) wt. % NaCl and at most 4 (e.g., at most 3, at most 2) wt. % NaCl. As an additional example, in certain embodiments, the colloidal silica gel 5080 (or 1080) contains at least 2.5 (e.g., at least 5, at least 7.5, at least 8) wt. % 1,6-hexanediol-diglycidyl-ether and at most 15 (e.g., at most 12.5, at most 10, at most 8) wt. % 1,6-hexanediol-diglycidyl-ether. As another example, in some embodiments, the colloidal silica gel 5080 (or 1080) contains at least 0.03 (e.g., at least 0.07, at least 0.1) wt. % oxygen scavenger and at most 1 (e.g., at most 0.9, at most 0.8) wt. % oxygen scavenger. As a further example, in certain embodiments, the colloidal silica gel 5080 (or 1080) contains at least 0.1 (e.g., at least 0.5, at least 1) wt. % corrosion inhibitor and at most 2 (e.g., at most 1.5) wt. % corrosion inhibitor.

In some embodiments, the colloidal silica gel silica gel is free from species that were not present in the composition from which the colloidal silica precipitated. As an example, in some embodiments, the colloidal silica gel is free of cement and/or non-aqueous-based fluid(s).

Examples

Forming a Colloidal Silica Gel

Figure 6:
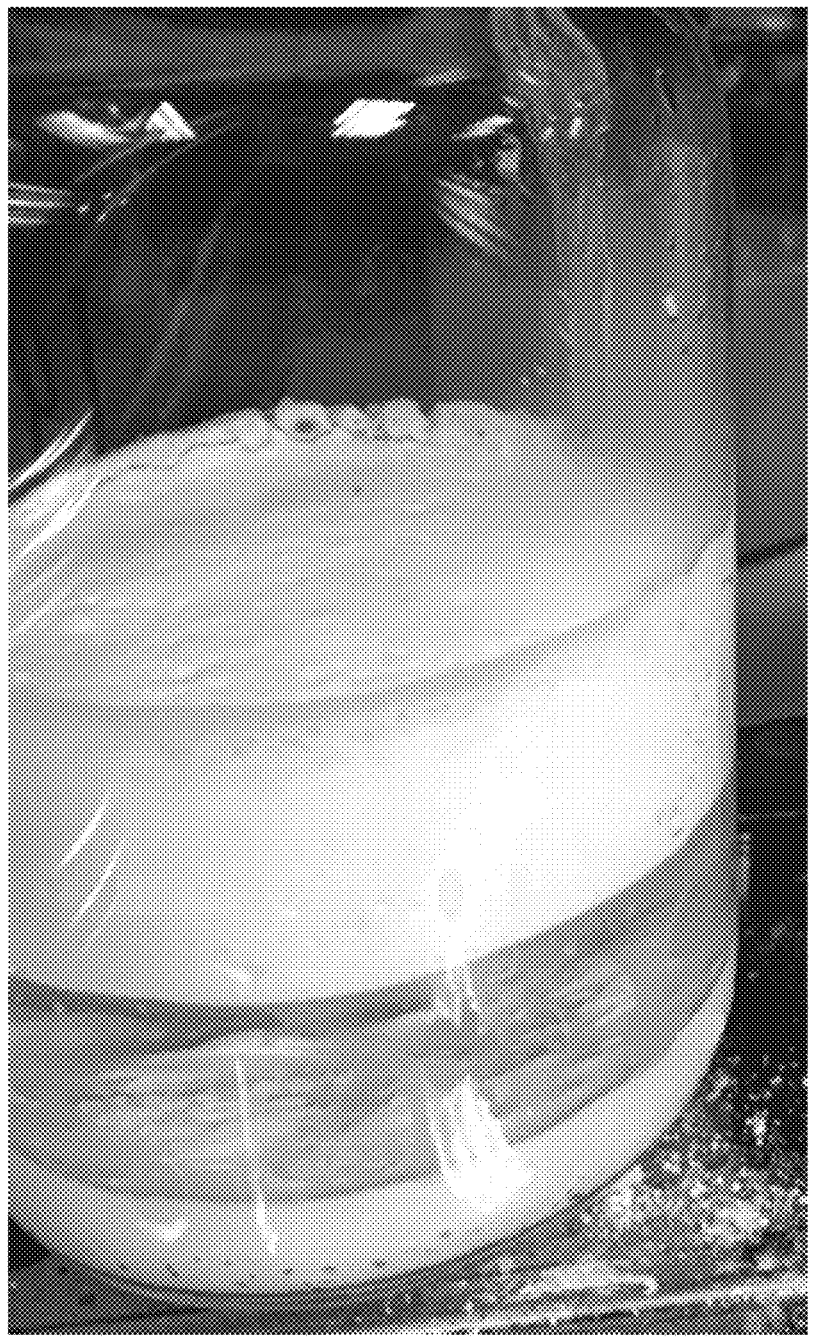
FIG. 6 is a photograph of a colloidal silica gel covered by an aqueous phase, which is, in turn covered by a low-density gel.

A composition that contained water, 20 wt. % CB17, and 2 wt. % NaCl was prepared in a container, and the colloidal silica gel was allowed to precipitate at room temperature for 2 minutes. FIG. 6 is a photograph of the colloidal silica gel that precipitated. From top to bottom, the three layers shown in FIG. 6 were a low-density gel (EXPANCEL WE40), an aqueous layer (2% NaCl brine) and the colloidal silica gel. The low-density gel was added to aid visualization of the aqueous layer.

Sample Calculations

A sample calculation was performed to determine the quantities of the constituents of Composition 1 for covering 10 feet (ft) above the bottom of the well cellar with Composition 1. The well cellar had a diameter of 3 m (9.84 ft). The colloidal silica gel formed by precipitation would cover only a portion of the space initially occupied by the composition. If the composition covered 10 ft, the precipitated colloidal silica layer would cover 2-3 ft above the bottom of the well cellar. The dimensions of the wellhead component(s) were not factored into the calculation. The relevant equations are shown below. The results are present in table 2.

$$\text{Cellar Volume} = \left(\frac{9.84}{2}\right)^2 * 3.14 * 10 = 760 \text{ ft}^3$$

$$\text{To Cover 10 ft of the Cellar} \frac{760 \text{ ft}^3}{5.615 \text{ ft}^3/\text{bbl}} = 135 \text{ bbl}$$

$$135 \text{ bbl} * \frac{159 \text{ L}}{1 \text{ bbl}} = 21465 \text{ L}$$

$$\text{Colloidal silica stock (volume)} = \frac{21465 \text{ L}}{2} = 10732.5 \text{ L}$$

$$\text{Water (volume)} = \frac{21465 \text{ L}}{2} = 10732.5 \text{ L}$$

$$\text{NaCl (mass)} = 10732.5 * 0.02 = 214.65 \text{ kg}$$

$$\text{Oxygen scavenger (mass)} = 10732.5 * \frac{0.07}{159} = 4.725 \text{ kg}$$

$$\text{Corrosion inhibitor (volume)} = 10732.5 * 0.01 = 107.325 \text{ L}$$

A corresponding sample calculation was performed to determine the quantities of the constituents in Composition 2 for covering 10 feet (ft) above the bottom of the well cellar with Composition 2. The well cellar had a diameter of 3 m (9.84 ft). The colloidal silica gel formed by precipitation would cover only a portion of the space initially occupied by the composition. If the composition covered 10 ft, the precipitated colloidal silica layer would cover 2-3 ft above the bottom of the well cellar. The dimensions of the wellhead component(s) were not factored into the calculation. The results are present in table 2.

TABLE 2

| | Water | CB17 | NaCl | 1,6-Hexanediol-diglycidyl-ether | OXYGON or FE-200 | O-36670R |
|---|---|---|---|---|---|---|
| Composition 1 | 10732.5 L | 10732.5 L | 214.65 kg | — | 4.725 kg | 107.325 L |
| Composition 2 | 10732.5 L | 10732.5 L | — | 1073.25 L | 4.725 kg | 107.325 L |

Water Permeation Experiment

A layer of sand was placed in a container. 10 ml of Composition 1 was placed on top of the layer of sand, and colloidal silica was allowed to precipitate from the composition at room temperature for 2 minutes, thereby forming colloidal silica gel on the layer of sand, and an aqueous layer on top of the colloidal silica gel. An additional layer of sand was placed on top of the aqueous layer, and the sand absorbed the water in the aqueous layer. The container was subsequently filled with water, and the container was held at room temperature. Over the course of a day, a portion of the top layer of water evaporated. The top water layer was replenished daily to replace the evaporated water. Through visual inspection, after 7 days, the bottom layer of sand (beneath the colloidal silica gel) remained dry. Therefore, none of the water disposed on the topmost layer of sand penetrated through the colloidal silica gel. Thus, the experiment demonstrated that water was unable to penetrate through the colloidal silica layer. It is therefore believed that the colloidal silica gel can be used to reduce (e.g., prevent) water-induced corrosion in wellhead components present in a well cellar.

Other Embodiments

While certain embodiments have been disclosed, the disclosure is not limited to such embodiments.

As an example, while embodiments have been disclosed in which a layer of sand is disposed on top of the layer of colloidal silica gel, in some embodiments, a layer of sand is not present above the colloidal silica gel. As an example, in certain embodiments, the colloidal silica gel may be covered with a different material, such as but not limited to silica, alumina, or small gravel rocks. As another example, in some embodiments, the colloidal silica gel extends to the upper surface of the well cellar, i.e., the surface of the earth.

What is claimed is:

1. A system comprising:
   a well cellar comprising a base and sidewalls extending from the base;
   a wellhead comprising an aboveground region extending above the well cellar and a belowground region in the well cellar, the belowground region of the wellhead comprising a wellhead component having an exterior surface;
   a colloidal silica gel occupying a volume extending from the base and sidewalls of the well cellar to the exterior surface of the wellhead component, wherein the colloidal silica gel covers the exterior surface of the wellhead component; and
   sand completely covering an upper surface of the colloidal silica gel.

2. The system of claim 1, wherein the colloidal silica gel substantially prevents water from passing through the colloidal silica gel to reach the exterior surface of the wellhead component.

3. The system of claim 1, wherein the wellhead component comprises a landing base.

4. The system of claim 1, wherein the wellhead component comprises a surface casing.

5. The system of claim 4, wherein the colloidal silica gel covers an exterior surface of an additional wellhead component.

6. The system of claim 5, wherein the additional wellhead component comprises a landing base.

7. The system of claim 1, wherein the system comprises a well selected from the group consisting of an oil well, a gas well and a water well.

8. The system of claim 1, wherein the base of the well cellar has an opening, and the wellhead comprises a plurality of casings that pass through and extend beneath the base of the well cellar.

9. The system of claim 8, wherein the plurality of casings comprises a surface casing and inner casings, and the surface casing houses the inner casings.

10. The system of claim 1, wherein the volume occupied by the colloidal silica gel is from 1 ft$^3$ to 30 ft$^3$.

11. The system of claim 1, wherein the colloidal silica gel comprises from 6.5 wt. % to 32 wt. % colloidal silica.

12. A system comprising:
   a well cellar comprising a base and sidewalls extending from the base;
   a wellhead comprising an aboveground region extending above the well cellar and a belowground region in the well cellar, the belowground region of the wellhead comprising a wellhead component having an exterior surface; and
   a colloidal silica gel occupying a volume extending from the base and sidewalls of the well cellar to the exterior surface of the wellhead component, wherein the colloidal silica gel covers the exterior surface of the wellhead component,
   wherein the wellhead comprises a landing base, and the colloidal silica gel covers an exterior surface of the landing base.

13. The system of claim 12, wherein the colloidal silica gel substantially prevents water from passing through the colloidal silica gel to reach the exterior surface of the wellhead component.

14. The system of claim 12, further comprising sand covering an upper surface of the colloidal silica gel.

15. The system of claim 12, wherein the wellhead component comprises a surface casing.

16. The system of claim 12, wherein the system comprises a well selected from the group consisting of an oil well, a gas well and a water well.

17. The system of claim 12, wherein the base of the well cellar has an opening, and the wellhead comprises a plurality of casings that pass through and extend beneath the base of the well cellar.

18. The system of claim 17, wherein the plurality of casings comprises a surface casing and inner casings, and the surface casing houses the inner casings.

19. The system of claim 12, wherein the volume occupied by the colloidal silica gel is from 1 ft$^3$ to 30 ft$^3$.

20. The system of claim 12, wherein the colloidal silica gel comprises from 6.5 wt. % to 32 wt. % colloidal silica.

* * * * *